United States Patent
Chen

(10) Patent No.: US 12,546,941 B2
(45) Date of Patent: Feb. 10, 2026

(54) PLANAR BURIED OPTICAL WAVEGUIDES IN SEMICONDUCTOR SUBSTRATE AND METHODS OF FORMING

(71) Applicant: II-VI Delaware, Inc., Wilmington, DE (US)

(72) Inventor: Young-Kai Chen, New Providence, NJ (US)

(73) Assignee: II-VI DELAWARE, INC., Wilmington, DE (US)

( * ) Notice: Subject to any disclaimer, the term of this patent is extended or adjusted under 35 U.S.C. 154(b) by 186 days.

(21) Appl. No.: 18/221,281

(22) Filed: Jul. 12, 2023

(65) Prior Publication Data
US 2024/0019632 A1 Jan. 18, 2024

Related U.S. Application Data

(60) Provisional application No. 63/389,514, filed on Jul. 15, 2022.

(51) Int. Cl.
*G02B 6/134* (2006.01)
*G02B 6/12* (2006.01)
(Continued)

(52) U.S. Cl.
CPC ...... *G02B 6/1347* (2013.01); *G02B 2006/121* (2013.01); *G02B 2006/12142* (2013.01);
(Continued)

(58) Field of Classification Search
CPC ............ G02B 6/1347; G02B 2006/121; G02B 2006/12188
(Continued)

(56) References Cited

U.S. PATENT DOCUMENTS 4,789,642 A * 12/1988 Lorenzo ............... G02B 6/1347
438/45
6,060,723 A 5/2000 Nakazato et al.
(Continued)

FOREIGN PATENT DOCUMENTS

CN 112014922 A * 12/2020 ............... G02B 6/10
JP 51-052791 5/1976
(Continued)

OTHER PUBLICATIONS

Japanese Office Action for Application No. 2023-116249, dated Mar. 6, 2024, 11 pages.
(Continued)

*Primary Examiner* — Robert Tavlykaev
(74) *Attorney, Agent, or Firm* — McAndrews, Held & Malloy, Ltd.

(57) ABSTRACT

A method of forming a semiconductor device may include providing semiconductor substrate having a substrate top side and a dielectric layer along the substrate top side and forming a first mask layer over the dielectric layer. The method may include forming a lower cladding wall and an upper cladding wall via a first opening in the first mask layer. The method may also include forming a second mask layer over the dielectric layer and forming side cladding walls via second openings in the second mask layer. Various semiconductor devices having a buried waveguide in formed via the method are also disclosed.

20 Claims, 6 Drawing Sheets

(51) Int. Cl.
*G02F 1/025* (2006.01)
*G02F 1/225* (2006.01)

(52) U.S. Cl.
CPC .... *G02B 2006/12173* (2013.01); *G02F 1/025* (2013.01); *G02F 1/2257* (2013.01)

(58) Field of Classification Search
USPC .......................................... 385/14, 129–132
See application file for complete search history.

(56) References Cited

U.S. PATENT DOCUMENTS

| | | | |
|---|---|---|---|
| 7,333,691 B1 | 2/2008 | Gill et al. | |
| 7,501,294 B1 | 3/2009 | Nakagawa | |
| 7,953,135 B2 | 5/2011 | Onishi | |
| 10,008,826 B1 | 6/2018 | Padullaparthi | |
| 10,473,858 B1 | 11/2019 | Mahgerefteh et al. | |
| 10,707,650 B2 | 7/2020 | Ghosh et al. | |
| 11,303,098 B1 | 4/2022 | Tandoi | |
| 11,757,256 B2 | 9/2023 | Tandoi | |
| 2005/0002430 A1 | 1/2005 | Ryou | |
| 2006/0133754 A1 | 6/2006 | Patel et al. | |
| 2007/0145388 A1 | 6/2007 | Philippens et al. | |
| 2007/0153867 A1 | 7/2007 | Muller | |
| 2007/0223543 A1 | 9/2007 | Prosyk et al. | |
| 2008/0193073 A1* | 8/2008 | Agranat | C23C 14/48 385/2 |
| 2008/0197289 A1 | 8/2008 | Muller | |
| 2009/0154871 A1* | 6/2009 | Pyo | G02B 6/30 438/31 |
| 2010/0086255 A1 | 4/2010 | Ishizaka | |
| 2010/0150500 A1 | 6/2010 | Pyo et al. | |
| 2013/0264544 A1 | 10/2013 | Karg et al. | |
| 2014/0233881 A1 | 8/2014 | Hatori et al. | |
| 2016/0131837 A1 | 5/2016 | Mahgerefteh et al. | |
| 2017/0199330 A1 | 7/2017 | Doany et al. | |
| 2018/0059324 A1 | 3/2018 | Tu et al. | |
| 2018/0231714 A1 | 8/2018 | Collins | |
| 2018/0314005 A1 | 11/2018 | Lin et al. | |
| 2020/0106242 A1 | 4/2020 | Kalifa et al. | |
| 2020/0133091 A1* | 4/2020 | Oh | G02F 1/2257 |
| 2020/0313397 A1 | 10/2020 | Jung et al. | |
| 2020/0335942 A1 | 10/2020 | Carson et al. | |
| 2021/0336420 A1 | 10/2021 | Tandoi | |
| 2023/0244095 A1* | 8/2023 | Sciancalepore | G02F 1/0147 216/24 |

FOREIGN PATENT DOCUMENTS

| | | |
|---|---|---|
| JP | H04-084129 | 3/1992 |
| JP | H4-267206 | 9/1992 |
| JP | 08-107253 | 4/1996 |
| JP | 2007149789 | 6/2007 |
| JP | 2009117407 | 5/2009 |
| JP | 2017219562 | 12/2017 |

OTHER PUBLICATIONS

Extended European Search Report for EP 23 18 5854, completed Oct. 31, 2023, 8 pages.
Japanese Office Action for Application No. 2024-128690, dated Sep. 24, 2025, 23 pages.

* cited by examiner

Material Properties

| | Lattice Constant (angstrom) | Melting Temp [C] | Young's Modulus [GPa] | Coef. Thermal Expansion (CTE) [1/K] | Thermal Conductivity [W/(m·K)] | Bulk Mobility [cm2/(V·s)] | 2DEG Mobility [cm2/(V·s)] | Saturation Velocity [1e+07 cm/s] | Band Gap Energy [eV] | Refra. Index (1.3um) | Relative Dielectric Constant | Breakdown Field [V/cm] |
|---|---|---|---|---|---|---|---|---|---|---|---|---|
| Si | 5.43 | 1,410 | 170 | 26.00E-07 | 130.00 | 1500 | 400 | 1.0 | 1.12 | 3.5 | 11.8 | 0.3e6 |
| GaAs | 5.65 | 1,238 | 85 | 57.30E-07 | 55.00 | 8500 | 1400 | 1.5 | 1.42 | 3.4 | 12.8 | 0.4e6 |
| InP | 5.87 | 1,062 | 61 | 46.00E-07 | 68.00 | 5400 | | 2.5 | 1.34 | 3.2 | 12.4 | 0.5e6 |
| GaN | 3.19 | 2,500 | 295 | 31.70E-07 | 130.00 | 1500 | 2000 | 1.4 | 3.40 | 2.3 | 12.2 | 4.0e6 |
| AlN | 3.11 | 2,200 | 310 | 42.00E-07 | 319.00 | 430 | ? | 1.3 | 6.20 | 2.01 | 9.2 | 15.4e6 |
| GaP | 5.43 | 1,740 | | | 80.00 | e-: 350/h+: 100 | | | 2.30 | 3.3 | 11.1 | |
| SiC (4H) | 3.08/10.05 | 2,730 | 748 | c: 40.00E-07 | 370.00 | 1000 | 100 | 2.0 | 3.30 | 2.57 | | 2.2 - 3.0e6 |
| SiC (6H) | 3.08/15.12 | 2,730 | 748 | a: 43.00E-07 | 490.00 | ~1000 | ~100 | ~2.0 | 3.00 | | 9.7 | ? |
| S-Diamond | 3.57 | 4,027 | 1220 | 11.00E-07 | 2290.00 | e-: 3500/h+: 3800 | h+: 680 | e-:2.3/h+:1.4 | 5.47 | 2.42 | 5.7 | 17.0e6 |
| Ga2O3 (β) | 3.05/5.81 | 1,900 | 26158-78000E-07 | 78.00E-07 | 25.00 | 180 | ? | 1.1e7 | 4.90 | | | 10.3e6 |
| BN (c) | 3.62 | 2,973 | 865 | 12.00E-07 | 940.00 | e-: 200/h+: 525 | | | 6.40 | | 4.5 | 17.5e6 |

*FIG. 8*

PLANAR BURIED OPTICAL WAVEGUIDES IN SEMICONDUCTOR SUBSTRATE AND METHODS OF FORMING

CLAIM OF PRIORITY AND CROSS-REFERENCE TO RELATED APPLICATIONS/INCORPORATION BY REFERENCE

This patent application is a non-provisional of U.S. Patent Application No. 63/389,514 filed on Jul. 15, 2022, the above-identified application is hereby incorporated herein by reference in its entirety.

TECHNICAL FIELD

The present disclosure generally relates to waveguides and methods of forming waveguides.

BACKGROUND

Silicon photonics involve the use of silicon as an optical medium for optical or optoelectronic devices. In some photonics devices, the silicon may be positioned on top of an oxide layer of a silicon substrate, such configurations are known as silicon on insulator (SOI). The silicon may be patterned into photonic components or micro-photonic components. Silicon photonic devices may be made using existing semiconductor fabrication techniques, and because silicon is already used as the substrate for some integrated circuits, it may be possible to create hybrid devices in which the optical and electronic components are integrated onto a single microchip.

Conventionally, such semiconductor fabrication techniques involved growth, deposition, or bonding with low refractive index materials followed by etching, blasting, regrowth, and planarization steps. However, the multiple growth and etching steps of such fabrication techniques result in poor surface planarity for heterogeneous integration with stacked chips or wafers.

BRIEF SUMMARY OF THE DISCLOSURE

Shown in and/or described in connection with at least one of the figures, and set forth more completely in the claims are waveguides and methods of forming such waveguides.

These and other advantages, aspects and novel features of the present disclosure, as well as details of illustrated embodiments thereof, will be more fully understood from the following description and drawings.

BRIEF DESCRIPTION OF THE DRAWINGS

The various features and advantages of the present disclosure may be more readily understood with reference to the following detailed description taken in conjunction with the accompanying drawings, wherein like reference numerals designate like structural elements.

FIG. 8 provides a table depicting properties for various semiconductor materials.

DESCRIPTION

Figure 1:
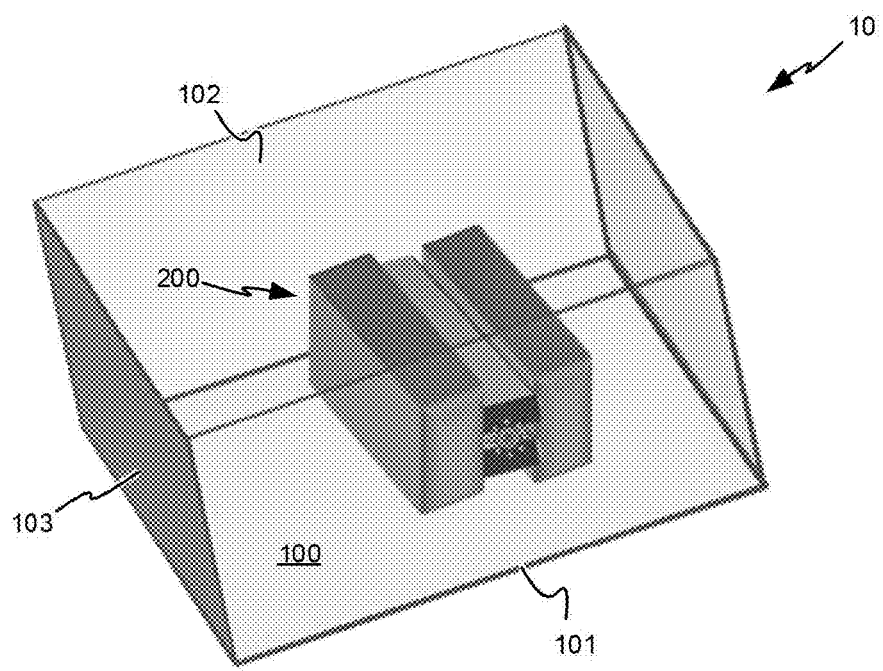
FIG. 1 provides a perspective view of a semiconductor device comprising an optical waveguide buried in a planar surface of a semiconductor substrate.

The following discussion presents various aspects of the present disclosure by providing examples thereof. Such examples are non-limiting, and thus the scope of various aspects of the present disclosure should not necessarily be limited by any particular characteristics of the provided examples. In the following discussion, the phrases "for example," "e.g.," and "exemplary" are non-limiting and are generally synonymous with "by way of example and not limitation," "for example and not limitation," and the like.

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z."

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a semiconductor device or package may be turned sideways so that its "top" surface is facing horizontally and its "side" surface is facing vertically, without departing from the teachings of the present disclosure.

In the drawings, the thickness or size of layers, regions, and/or components may be exaggerated for clarity. Accordingly, the scope of this disclosure should not be limited by such thickness or size. Additionally, in the drawings, like reference numerals may refer to like elements throughout the discussion. Elements numbered with an apostrophe (') can be similar to correspondingly numbered elements without an apostrophe.

Unless specified otherwise, the term "coupled" may be used to describe two elements directly contacting each other or describe two elements indirectly connected by one or more other elements. For example, if element A is coupled to element B, then element A can be directly contacting element B or indirectly connected to element B by an intervening element C. Similarly, the terms "over" or "on" may be used to describe two elements directly contacting each other or describe two elements indirectly connected by one or more other elements.

Figure 2:
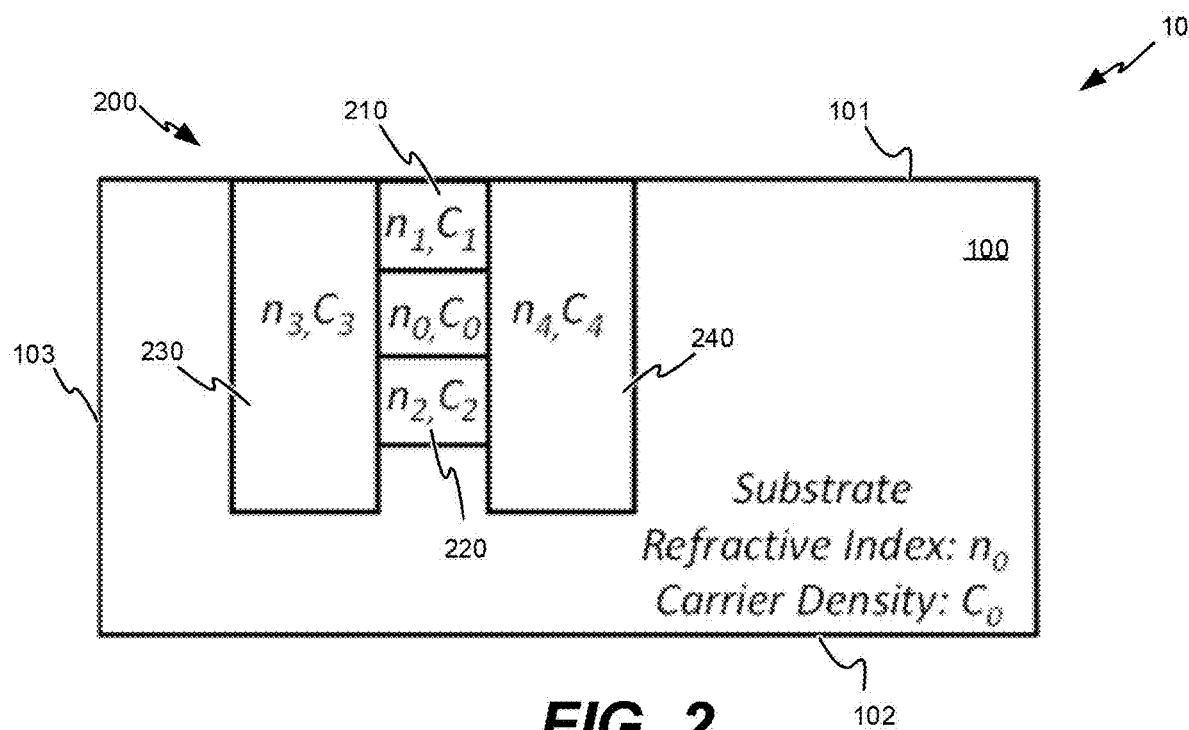
FIG. 2 provides a cross-section view of the semiconductor device of FIG. 1.

Referring now to FIGS. 1 and 2, a semiconductor device 10 comprising a semiconductor substrate 100 and a planar optical waveguide 200 buried in the semiconductor substrate 100 are shown. In particular, the semiconductor substrate 100 may have a refractive index $n_0$ and a carrier density of $C_0$. As will be explained in greater detail below with regard to FIGS. 3A-3F, the waveguide 200 and its walls 210, 220, 230, 240 may be highly doped regions through diffusion, ion implantation, or selective growth and planarization techniques. To this end, the crystal composition of the semiconductor substrate 100 may be modified to reduce its refractive index by free carriers from high concentration of dopants (e.g., aluminum or nitrogen in SiC). In particular, the refractive index may be reduced by free carriers per equation (1):

$$n_i = n_0 - \Delta n_i; \Delta n_i \sim f\left(\frac{Ci - C0}{n0}\right) \quad (1)$$

where:
$n_1$: refractive index of the cladding region
$n_0$: refractive index of substrate
$C_0$: residual free carrier density of substrate
$C_i$: free carrier density of the cladding region.

Such regions may experience low optical loss when photon frequency is above the plasma frequency of carriers and below the bandgap absorption frequency of the waveguide materials (e.g., 1,300/1,500 nm in highly doped SiC.)

See, Bennet, et. al., *IEEE, J. Quantum Elec.*, 26, 113 (1990) and Bosma, et al., *J. Appl. Phys.* 131, 025703 (2022), the contents of which are hereby incorporated by reference in their entirety.

Referring now to FIGS. 3A-3F, a process for fabricating the semiconductor device 10 of FIGS. 1-2 is shown. The highly doped regions may be formed by introducing the dopants of high concentration with an exemplified planar ion implantation process, while other planar selective doping processes such as diffusion or selective growth may also be used. At FIG. 3A, a semiconductor substrate 100 having a refractive index $n_0$ is provided. The semiconductor substrate 100 may include a substrate top side 101, a substrate bottom side 102 opposite the substrate top side 101, and substrate lateral sides 103 between the substrate top side 101 and the substrate bottom sides 102. Moreover, a dielectric layer 110 may be formed on the substrate top side 101. In various embodiments, the dielectric layer 110 may be formed via a deposition process.

Figure 3A:
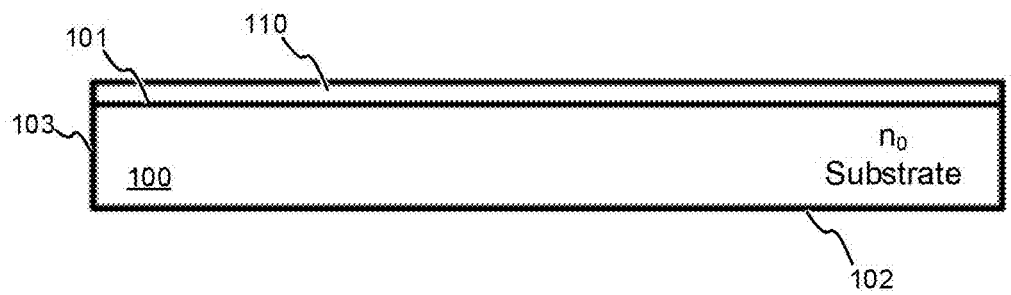
FIGS. 3A-3F depict a process for manufacturing the semiconductor device of FIGS. 1 and 2.
Figure 3B:
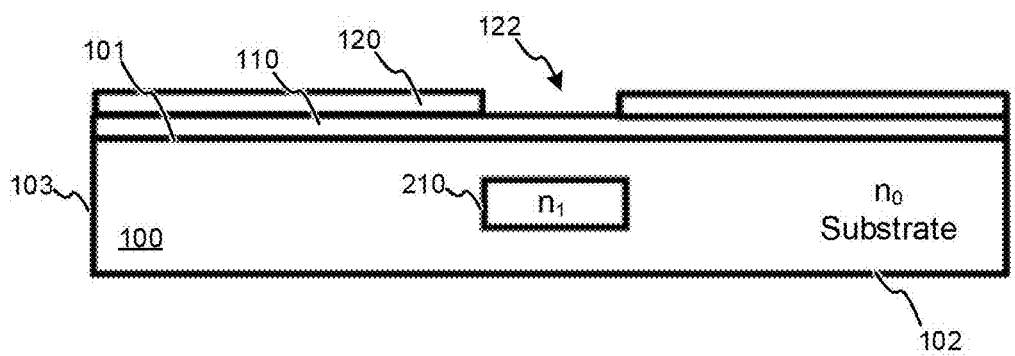

As shown in FIG. 3B, a first mask layer 120 having an opening 122 may be formed on the dielectric layer 110. In various embodiments, the first mask layer 120 may be formed on the dielectric layer 110 through deposition and/or other techniques. Further, the openings 122 may be formed via photolithography, laser ablation, and/or other processes.

As further shown in FIG. 3B, a lower cladding wall 210 of the waveguide 200 may be formed in the semiconductor substrate 100 via ion-implantation or another doping process. For example, a deep ion-implantation may implant ions through the opening 122 and form a doped horizontal region having a refractive index of $n_2$. This doped horizontal region may provide the lower cladding wall 210 of the waveguide 200.

Figure 3C:
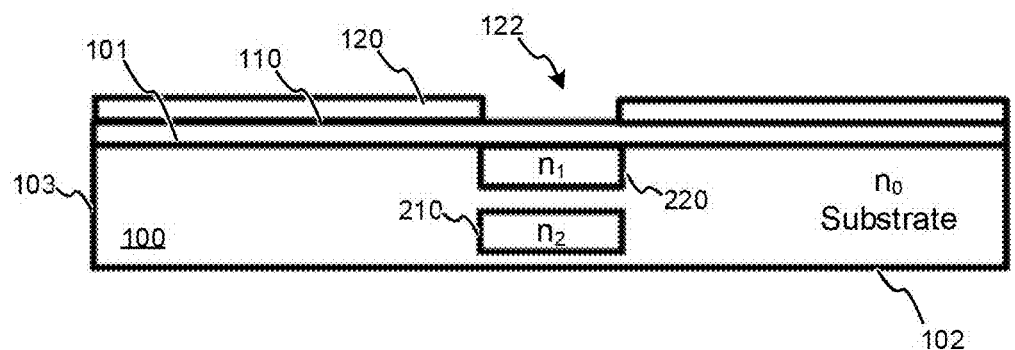

As shown in FIG. 3C, an upper cladding wall 220 of the waveguide 200 may be formed in the semiconductor substrate 100 via ion-implantation or another doping process in a similar manner as the lower cladding wall 210. For example, a shallow ion-implantation process may implant ions through the same opening 122 used to form the lower cladding wall 210. The implanted ions may form a doped horizontal region above the lower cladding wall 210 that has a refractive index of $n_1$. This doped horizontal region may provide the upper cladding wall 220 of the waveguide 200. In some embodiments, the shallow ion-implantation process imparts the implanted ions with less energy than the deep ion-implantation process thus resulting in the ions of the shallow ion-implantation process not being implanted as deeply into the substrate top side 101.

Figure 3D:
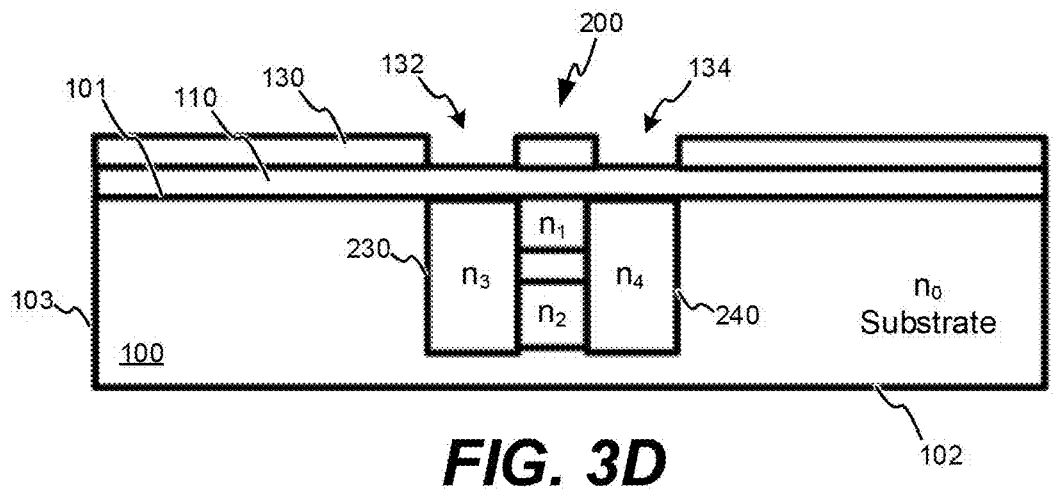

As shown in FIG. 3D, the first mask layer 120 of FIGS. 3B and 3C may be removed and replaced with a second mask layer 130 having openings 132, 134. For example, the first mask layer 120 may be removed via etching, grinding, and/or some other means. Further, the second mask layer 130 may be formed on the dielectric layer 110 through deposition and/or other techniques. Further, the openings 132, 134 may be formed via photolithography, laser ablation, and/or other processes.

Via such openings 132, 134, the side cladding walls 230, 240 of the waveguide 200 may be formed via ion-implantation or another doping process. For example, ions may be implanted at various depths in the semiconductor substrate 100 via such openings 132, 134. Through multiple ion-implantations via openings 132, 134, doped vertical regions having refractive indices of $n_3$ and $n_4$ may be formed. In various embodiments, the multiple ion-implantations may span a range of energies so as to implant ions across a range of depths into the substrate top side 101 to form the doped vertical regions. These doped vertical regions may provide the side cladding walls 230, 240 of the buried waveguide 200. As shown, the side cladding walls 230, 240 may laterally flank both the lower cladding wall 210 and the upper cladding wall 220 such that the lower cladding wall 210 and upper cladding wall 220 are positioned between the side cladding walls 230, 240. In the depicted embodiment, the lower cladding wall 210 and upper cladding wall 220 may span or otherwise traverse from one side cladding wall 230 to the other side cladding wall 240. Similarly, the side cladding walls 230, 240 may span or otherwise traverse from the lower cladding wall 210 to the upper cladding wall 220.

Figure 3E:
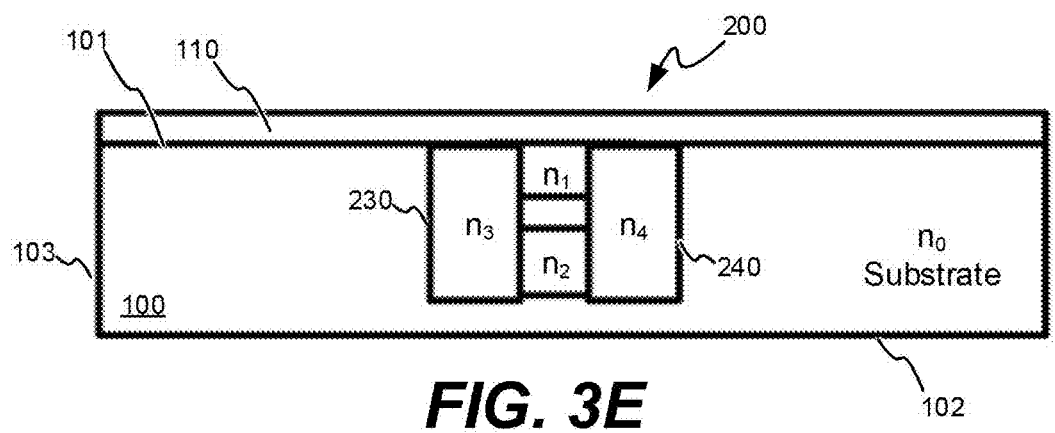
Figure 3F:
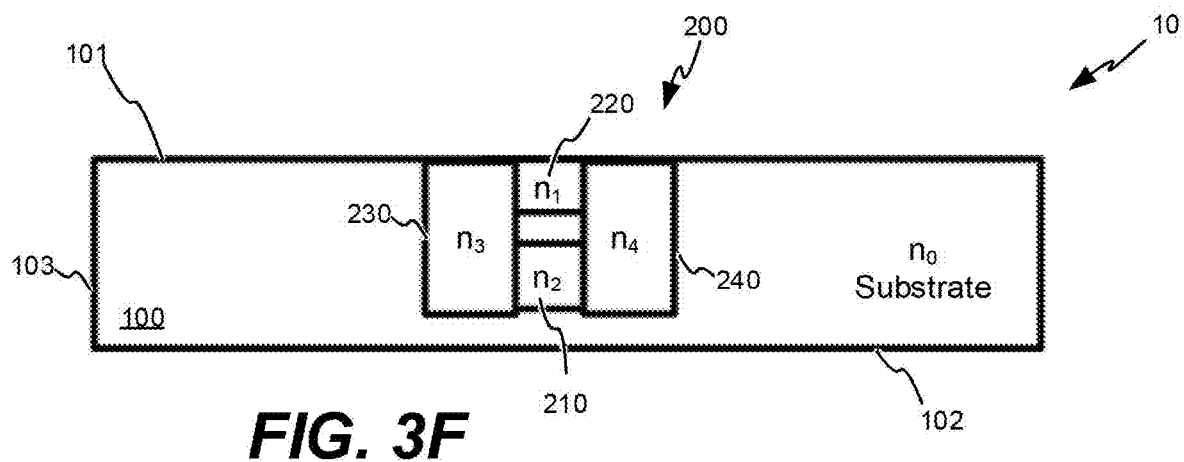

The second mask layer 130 of FIG. 3D may be removed as shown at FIG. 3E and the semiconductor device 10 may be annealed to activate free carriers in the doped regions. For example, the second mask layer 130 may be removed via etching, grinding, and/or some other means. After such annealing, the dielectric layer 110 may be removed. Again, the dielectric layer 110 may be removed via etching, grinding, and/or some other means to achieve the semiconductor device of FIGS. 1 and 2. Of note, it should be appreciated that the substrate top side 101 of the semiconductor device 10 as a result of the process of FIGS. 3A-3F may remain a planar surface. Such planarity may prove conducive to the subsequent formation of other structures over the waveguide 200 such as, for example, conductive pads or contacts as shown in FIGS. 4-7.

Figure 4:
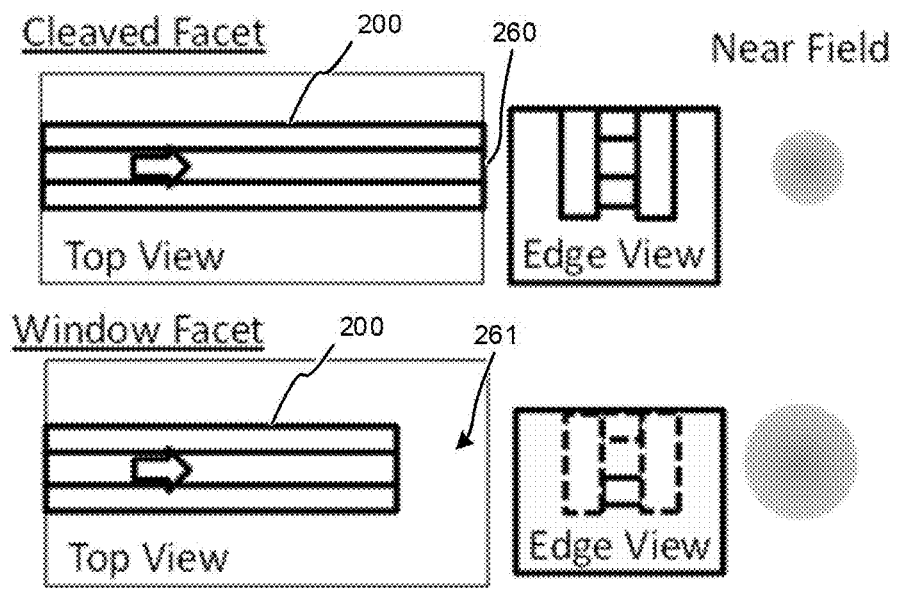
FIG. 4 provides top views and edge views of cleaved faceted and window faceted laser devices manufactured per the process of FIGS. 3A-3F.

FIGS. 4-7 depict various semiconductor devices, which may be manufactured per the process of FIGS. 3A-3F so as to obtain semiconductor devices that each have a planar upper surface and a buried waveguide that comprises at least a portion of the respective optical structure. In particular, FIG. 4 provides top views and edge views of cleaved faceted and window faceted laser devices. As shown, a cleaved faceted laser device may comprise a buried waveguide 200 in which an output end of the waveguide 200 extends to a cleaved facet 260 that emits a laser output from a substrate lateral side 103 of the semiconductor substrate 100. Conversely, the window faceted laser device may comprise a buried waveguide 200 in which an output end of the waveguide 200 extends toward but short of a substrate lateral side 103 to emit a laser output from the substrate lateral side 103 via a window facet 261.

Figure 5:
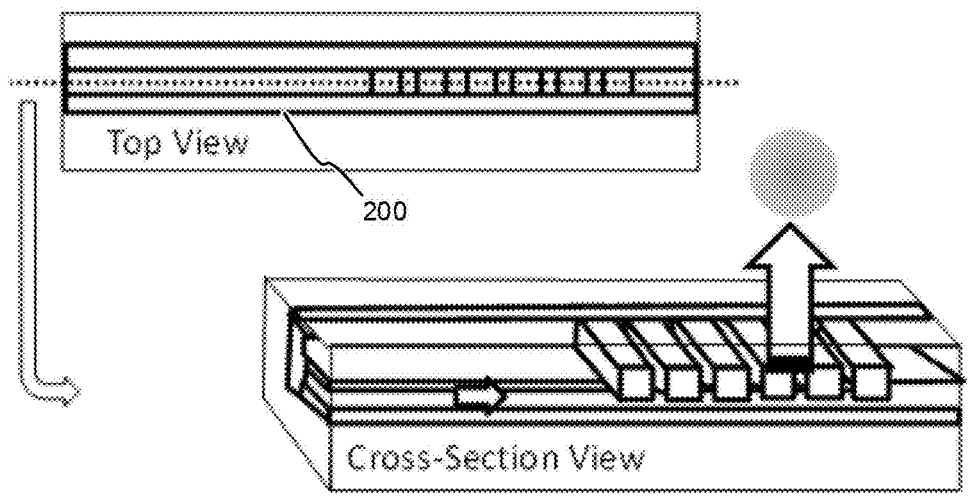
FIG. 5 provides a top view and a cross-section view of a vertical grating coupler manufactured per the process of FIGS. 3A-3F.

FIG. 5 provides a top view and a cross-section view of a buried waveguide 200 with a vertical grating coupler 270. As shown, the vertical grating coupler 270 may direct a laser output of the waveguide 200 toward the substrate top side 101. As such, the laser device of FIG. 5 may emit laser output from the substrate top side 101 instead of a substrate lateral side.

Figure 6:
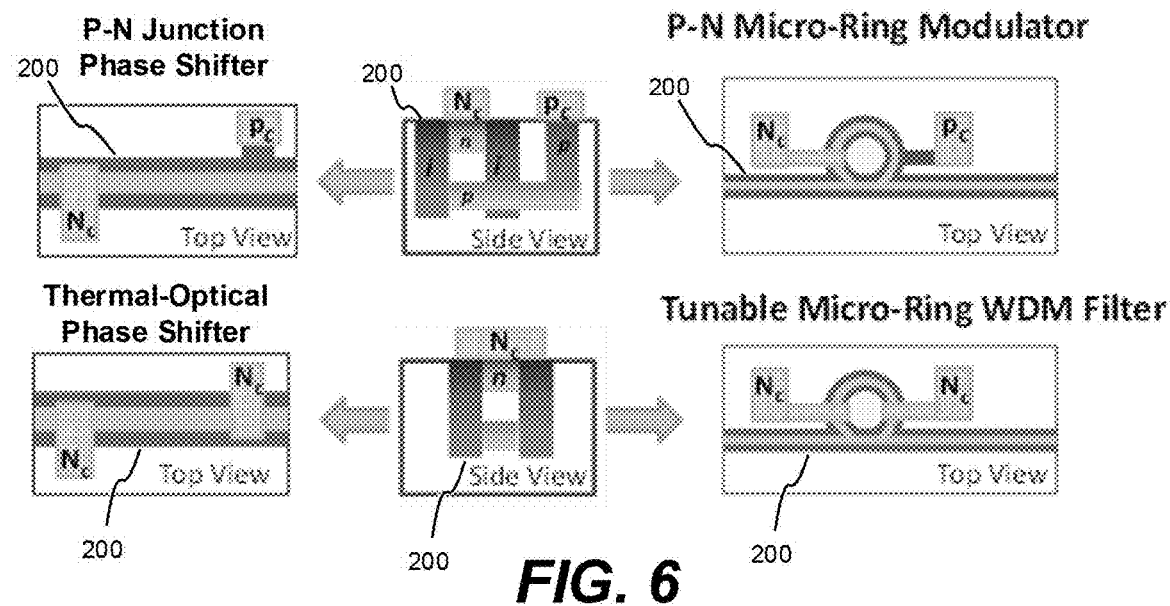
FIG. 6 provides top views and side views for a p-n junction phase shifter, a thermal-optical phase shifter, a p-n micro-ring modulator, and a tunable micro-ring wavelength-division multiplexing (WDM) filter.
Figure 7:
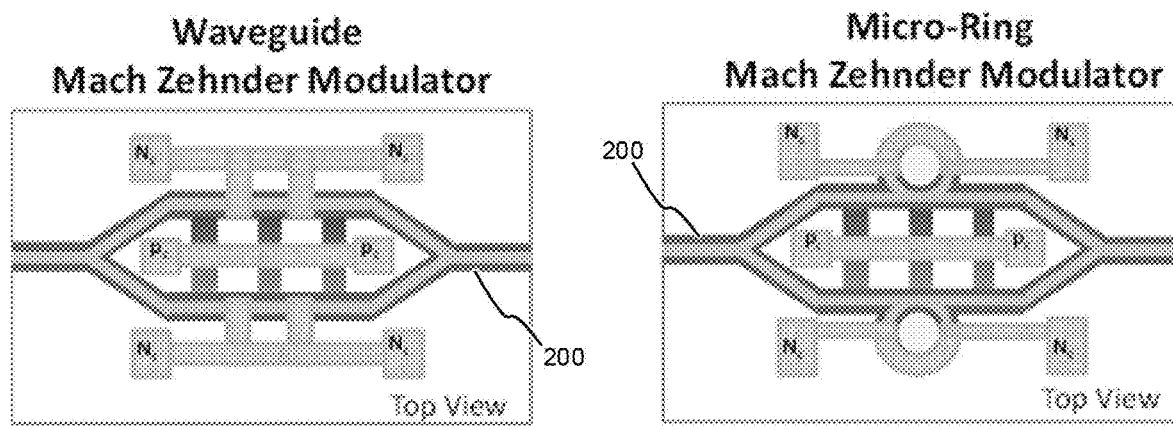
FIG. 7 provides top views for a waveguide Mach-Zehnder modulator and a micro-ring Mach-Zehnder modulator.

FIG. 6 provides top views and side views for a p-n junction phase shifter, a thermal-optical phase shifter, a p-n micro-ring modulator, and a tunable micro-ring wavelength-division multiplexing (WDB) filter. FIG. 7 provides top views for a waveguide Mach-Zehnder modulator and a micro-ring Mach-Zehnder modulator. As shown by the structures depicted in FIGS. 6 and 7, the process of FIGS. 3A-3F may be used to form cladding walls 210, 220, 230, 240 of the waveguides 200 and/or other structures of various geometric arrangements. To this end, the first mask layer 120 and/or the second mask layer 130 may be patterned to provide suitable openings for forming the cladding walls 210, 220, 230, 240 per the respective geometric arrangements.

Finally, FIG. 8 depicts properties for various semiconductor materials which may be suitable for semiconductor substrate 100 of FIGS. 1-7.

The present disclosure includes reference to certain examples, however, it will be understood by those skilled in the art that various changes may be made and equivalents may be substituted without departing from the scope of the disclosure. In addition, modifications may be made to the disclosed examples without departing from the scope of the present disclosure. Therefore, it is intended that the present disclosure not be limited to the examples disclosed, but that the disclosure will include all examples falling within the scope of the appended claims.

What is claimed is:

1. A method of burying a waveguide in a semiconductor substrate, the method comprising:
    forming a first mask layer over a top side of the semiconductor substrate such that the first mask layer comprises a vertical opening that passes through the first mask layer from a top side of the first mask layer to a bottom side of the first mask layer;
    ion-implanting through the vertical opening in the first mask layer to form, below the top side of the semiconductor substrate, a lower cladding wall of the waveguide;
    ion-implanting through the vertical opening in the first mask layer to form, below the top side of the semiconductor substrate, an upper cladding wall of the waveguide;
    forming a second mask layer over the top side of the semiconductor substrate; and
    ion-implanting through the second mask layer to form, below the top side of the semiconductor substrate, side cladding walls of the waveguide; and
    wherein the ion-implanting of the upper cladding wall, the ion-implanting of the lower cladding wall, and the forming of the side cladding walls results in the upper cladding wall being over the lower cladding wall, and the side cladding walls laterally flanking the lower cladding wall and the upper cladding wall.

2. The method of claim 1, comprising forming a dielectric layer along the top side of the semiconductor substrate prior to forming the first mask layer.

3. The method of claim 1, comprising:
    removing the first mask layer after ion-implanting the lower cladding wall and ion-implanting the upper cladding wall;
    wherein forming the second mask layer comprises forming the second mask layer after removing the first mask layer, and forming a first vertical opening and a second vertical opening that each pass through the second mask layer; and
    wherein the ion-implanting through the second mask layer comprises ion-implanting through the first vertical opening and the second vertical opening.

4. The method of claim 1, wherein the ion-implanting through the second mask layer comprises using a range of energies such that the side cladding walls of the waveguide each vertically spans between the lower cladding wall and the upper cladding wall.

5. A method of burying a waveguide in a semiconductor substrate, the method comprising:
    forming a lower cladding wall of the waveguide below a top side of the semiconductor substrate;
    forming an upper cladding wall of the waveguide below the top side of the semiconductor substrate;
    forming a mask layer over a top side of the semiconductor substrate such that the mask layer comprises a first vertical opening and a second vertical opening that each pass through the mask layer from a top side of the mask layer to a bottom side of the mask layer; and
    ion-implanting through the first vertical opening and the second vertical opening in the mask layer to respectively form, below the top side of the semiconductor substrate, a first side cladding wall and a second side cladding wall of the waveguide; and
    wherein the forming of the upper cladding wall, the forming of the lower cladding wall, and the ion-implanting of the first side cladding wall and the second side cladding wall results in the upper cladding wall being over the lower cladding wall, and the first side cladding wall and the second side cladding wall laterally flanking the lower cladding wall and the upper cladding wall.

6. The method of claim 5, wherein the ion-implanting of the first side cladding wall and the second side cladding wall comprises ion-implanting using a range of energies such that the first side cladding wall and the second side cladding wall each vertically spans between the lower cladding wall and the upper cladding wall.

7. A semiconductor device, comprising:
a semiconductor substrate having a semiconductor substrate top side and a waveguide buried below the semiconductor substrate top side; and
wherein the waveguide comprises a doped lower cladding wall, a doped upper cladding wall vertically over the doped lower cladding wall, and doped side cladding walls that laterally flank the doped lower cladding wall and the doped upper cladding wall;
wherein the doped side cladding walls are implanted, through a mask, separately from the doped upper cladding wall and the doped lower cladding wall;
wherein each doped side cladding wall comprises a lower portion laterally adjacent the doped lower cladding wall and an upper portion laterally adjacent the doped upper cladding wall; and
wherein the upper portion of each doped side cladding wall is vertically over its respective lower portion.

8. The semiconductor device of claim 7, wherein an index of refraction for each of the doped lower cladding wall, the doped upper cladding wall, and the doped side cladding walls differs from an index of refraction for the semiconductor substrate.

9. The semiconductor device of claim 7, wherein a density of free carriers for each of the doped lower cladding wall, the doped upper cladding wall, and the doped side cladding walls differs from a density of free carriers for the semiconductor substrate.

10. The semiconductor device of claim 7, wherein:
the doped side cladding walls includes a first doped side cladding wall and a second doped side cladding wall; and
the doped lower cladding wall spans from the first doped side cladding wall to the second doped side cladding wall.

11. The semiconductor device of claim 10, wherein the doped upper cladding wall spans from the first doped side cladding wall to the second doped side cladding wall.

12. The semiconductor device of claim 7, wherein:
the doped side cladding walls include a first doped side cladding wall and a second doped side cladding wall;
the first doped side cladding wall spans from the doped lower cladding wall to the upper doped cladding wall; and
the second doped side cladding wall spans from the doped lower cladding wall to the upper doped cladding wall.

13. The semiconductor device of claim 12, wherein the first doped side cladding wall and the second doped side cladding wall extend below the doped lower cladding wall.

14. The semiconductor device of claim 12, wherein the first doped side cladding wall and the second doped side cladding wall extend to the semiconductor substrate top side.

15. The semiconductor device of claim 12, wherein the semiconductor substrate top side is planar over the waveguide.

16. The semiconductor device of claim 7, comprising:
a cleaved facet at a lateral side of the semiconductor substrate; and
wherein an output end of the waveguide extends to the cleaved facet.

17. The semiconductor device of claim 7, wherein the waveguide comprises a portion of a modulator.

18. The semiconductor device of claim 7, wherein the waveguide comprises a portion of a filter.

19. The semiconductor device of claim 7, wherein the waveguide comprises a portion of a phase shifter.

20. The semiconductor device of claim 7, wherein the waveguide comprises a portion of a Mach-Zehnder modulator.

* * * * *